(12) United States Patent
Skubic

(10) Patent No.: US 12,381,957 B2
(45) Date of Patent: Aug. 5, 2025

(54) NETWORK NODE AND METHOD PERFORMED THEREIN FOR PROVIDING AN APPLICATION IN A COMMUNICATION NETWORK

(71) Applicant: Telefonaktiebolaget LM Ericsson (PUBL), Stockholm (SE)

(72) Inventor: Björn Skubic, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 11 days.

(21) Appl. No.: 17/595,448

(22) PCT Filed: May 17, 2019

(86) PCT No.: PCT/SE2019/050451
§ 371 (c)(1),
(2) Date: Nov. 17, 2021

(87) PCT Pub. No.: WO2020/236042
PCT Pub. Date: Nov. 26, 2020

(65) Prior Publication Data
US 2022/0191292 A1 Jun. 16, 2022

(51) Int. Cl.
*H04L 67/148* (2022.01)
*H04L 41/0893* (2022.01)
*H04L 67/52* (2022.01)

(52) U.S. Cl.
CPC ........ *H04L 67/148* (2013.01); *H04L 41/0893* (2013.01); *H04L 67/52* (2022.05)

(58) Field of Classification Search
CPC .. H04L 67/148; H04L 67/152; H04L 41/0893
See application file for complete search history.

(56) References Cited

U.S. PATENT DOCUMENTS

| 10,412,616 B1* | 9/2019 | Butler | H04W 28/0226 |
| 2018/0192390 A1* | 7/2018 | Li | H04W 4/60 |
| 2022/0200813 A1* | 6/2022 | Thiebaut | H04L 12/1407 |

OTHER PUBLICATIONS

3GPP TS 23.501 v15.3.0; Technical Specification; 3rd Generation Partnership Project; Technical Specification Group Services and System Aspects; System Architecture for the 5G System; Stage 2 (Release 15)—Sep. 2018.
3GPP TS 23.502 v15.3.0; Technical Specification; 3rd Generation Partnership Project; Technical Specification Group Services and System Aspects; Procedures for the 5G System; Stage 2 (Release 15)—Sep. 2018.
PCT International Preliminary Report On Patentability issued for International application No. PCT/SE2019/050451—Jun. 10, 2021.

(Continued)

*Primary Examiner* — Ryan J Jakovac
(74) *Attorney, Agent, or Firm* — Baker Botts L.L.P.

(57) ABSTRACT

Embodiments herein provide e.g. a method performed by a network node (13) for providing an application to a user equipment, UE, (10) in a communication network. The network node (13) obtains location information indicating a location of the UE (10); and determines an anchor point for the UE (10) based on the obtained location information and a configuration of an edge connectivity service associated with the application.

15 Claims, 11 Drawing Sheets

(56) References Cited

OTHER PUBLICATIONS

PCT Notification of Transmittal of the International Search Report and the Written Opinion of the International Searching Authority, or the Declaration issued for International application No. PCT/SE2019/050451—Jul. 11, 2019.
3GPP TSG SA WG2 Meeting #123; Ljubljana, Slovenia; Source: Huawei, HiSilicon; Title: TS 23.501: Clarification and correction of AF influence on traffic routing (S2-178027 (revision of S2-177882))—Oct. 23-27, 2017.
3GPP TSG-SA2 Meeting #131; Tenerife, Spain; Change Request; Title: General description of solution 1 in 23.725 for user plane redundancy; Source to WG: Ericsson; Source to TSG: SA2 (S2-1902825 (revision of S2-1901625))—Feb. 25-Mar. 1, 2019.

* cited by examiner

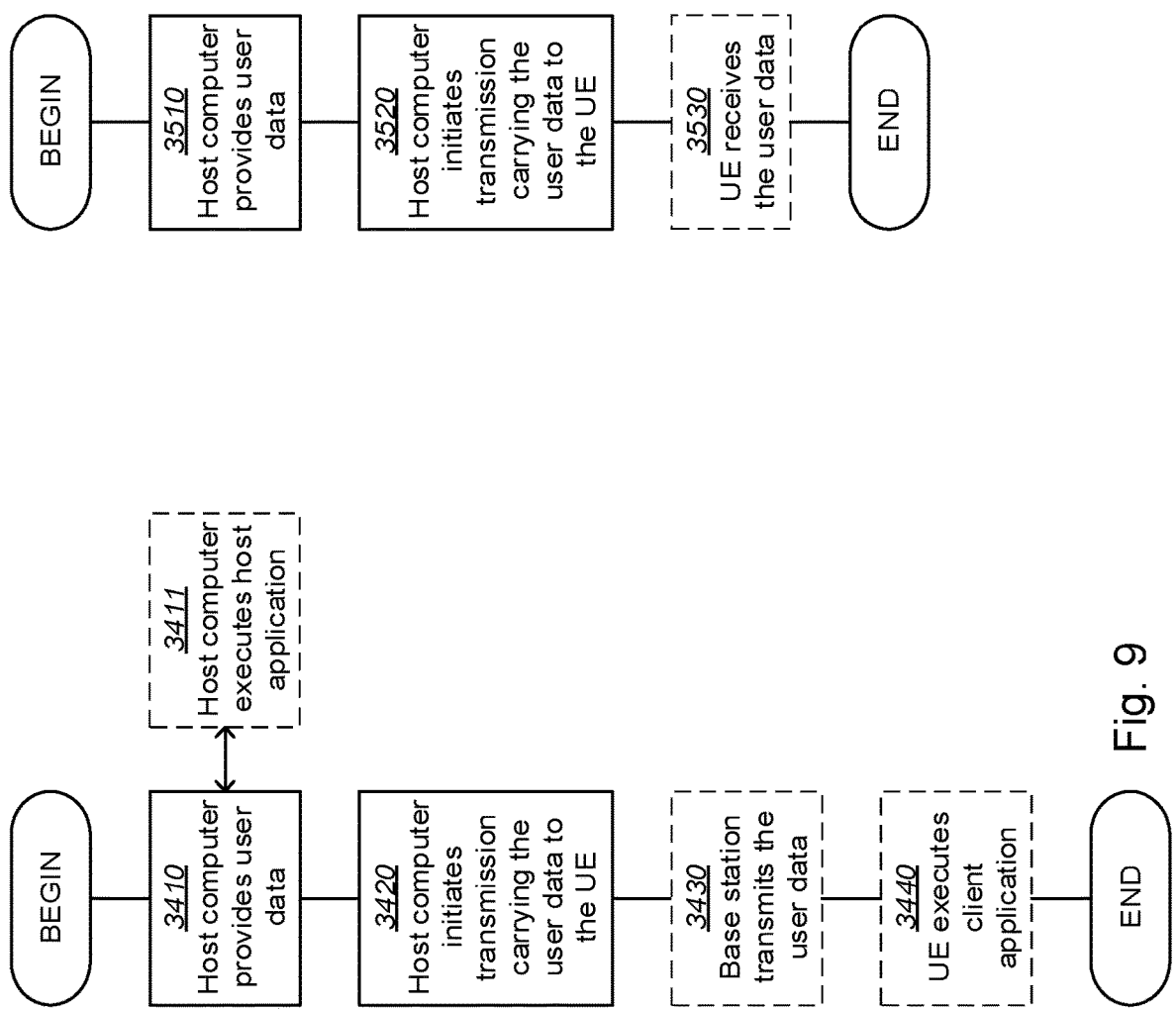

NETWORK NODE AND METHOD PERFORMED THEREIN FOR PROVIDING AN APPLICATION IN A COMMUNICATION NETWORK

PRIORITY

This nonprovisional application is a U.S. National Stage Filing under 35 U.S.C. § 371 of International Patent Application Serial No. PCT/SE2019/050451 filed May 17, 2019 and entitled "NETWORK NODE AND METHOD PERFORMED THEREIN FOR PROVIDING AN APPLICATION IN A COMMUNICATION NETWORK" which is hereby incorporated by reference in its entirety.

TECHNICAL FIELD

Embodiments herein relate to a network node and method performed therein regarding communication. In particular, embodiments herein relate to handling communication such as providing applications or services in a communication network.

BACKGROUND

In a typical communication network, user equipments (UE), also known as wireless communication devices, mobile stations, stations (STA) and/or wireless devices, may communicate via a Radio Access Network (RAN) to one or more core networks (CN). The RAN covers a geographical area which is divided into service areas, also known as cells, with each cell being served by a radio network node e.g., a Wi-Fi access point or a radio base station (RBS), which in some networks may also be called, for example, a NodeB, an eNodeB or a gNodeB. The cell is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the Third Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

End-user services may be provided in a cloud manner through distributed applications that are hosted in a distributed cloud. The distribution can be exploited for different purposes. It may be exploited for providing improved service quality by allowing each user to be served from a nearby location in order to minimize the effects of network latency and congestion. It may be exploited for providing increased service resilience in case of failures in the cloud infrastructure or communication network.

An edge cloud here refers to a distributed cloud where users are accessing end-user services provided by applications that are hosted in the distributed cloud and where users are accessing the service via a mobile network. The application that provides the end-user service may be a distributed application deployed across multiple cloud locations. It may also be an application where individual application instances are deployed at multiple cloud locations. In both cases we will refer to the instantiation of an application or application component at a cloud location as an application instance. The mobile network carries user traffic between the UE and a communication anchor point. The anchor point herein meaning a point or node that terminates a mobile network user plane session at a data network. The data network may be identified by an identifier such as a data network access identifier (DNAI). The anchor point may e.g. in 5G be referred to as a protocol data unit (PDU) session anchor (PSA) user plane function (UPF) node. The user traffic is further carried between the anchor point and an application instance in the edge cloud node via the data network.

In order to exploit the geographical distribution of edge cloud nodes, coordination between the mobile access networks and the edge cloud and/or the end-user service application is required to make sure UEs are served from an application instance at an edge cloud location which is close to the UE, and where the communication anchor point in the mobile access network is close to the location of the edge cloud node. FIG. 1 shows an edge cloud with nodes at multiple locations, where the end-user service is provided by an application with application instances at all or a subset of edge cloud locations, where the mobile network is capable of carrying user traffic between the client and more than one communication anchor point, and where the optimal selection of anchor point for a particular UE depends on the UE location and the subset of edge cloud nodes that are hosting the application. Coordination is needed for handling e.g. edge site selection and edge site handover of clients served by the edge cloud via the mobile access network.

In existing deployments of distributed cloud, the degree of distribution is limited. Larger cloud providers offer limited distribution with few (if any) sites per country. Workload placement in the distributed cloud is optimized independently from the access network. In typical mobile network deployments, the number of communication anchor points per country are few. The selection of anchor point for a UE is static or semi-static. It is primarily during roaming in another operator's mobile network that an alternative communication anchor point is selected for the UE in the visited mobile network operator.

In order to allow new edge-based end-user services to exploit further distribution of the cloud, several changes in the mobile networks are required. Additional communication anchor points are needed and these should be selected to clients based on different optimization objectives.

In the context of 5G core network (5GC) new mechanisms are introduced for local breakout. These mechanisms will enable a more access near edge cloud and the benefits it may bring such as latency reduction and resource efficiency. It also introduces requirements on handling the coordination between mobile access network and distributed cloud.

A problem in an edge cloud is how to enable location aware routing of client traffic to correct edge location exploiting new break out mechanisms in 5G. Existing solutions, used e.g. in content delivery networks (CDN), based on domain name server (DNS) which resolves an internet protocol (IP) address to a closest edge location, provide a solution for routing from an anchor point in the mobile network to an edge site. However, it does not provide a mechanism to change the communication anchor point associated with a client at the UE.

SUMMARY

An object herein is to improve services or applications to enable mobility between application instances in a communication network in a more efficient manner.

According to an aspect the object is achieved by providing a method performed by a network node, also referred to as ECS node, for providing an application to service a user equipment in a communication network. The network node obtains location information indicating a location of a user equipment. The network node further determines an anchor point for the UE based on the obtained location information and a configuration of edge connectivity service of the application. The edge connectivity service defines the connectivity service provided for the application to service the end-user. The application may be a distributed application of application instances deployed at multiple edge cloud locations.

It is furthermore provided herein a computer program product comprising instructions, which, when executed on at least one processor, cause the at least one processor to carry out any of the methods above, as performed by the network node. It is additionally provided herein a computer-readable storage medium, having stored thereon a computer program product comprising instructions which, when executed on at least one processor, cause the at least one processor to carry out the method according to any of the methods above, as performed by the network node.

According to embodiments herein a network node for providing an application to service a user equipment in a communication network is also herein provided. The network node is configured to obtain location information indicating a location of a user equipment. The network node is further configured to determine an anchor point for the UE based on the obtained location information and a configuration of an edge connectivity service of the application.

Embodiments herein provide methods wherein the network node utilizes location information indicating location of the UE, such as a tracking area of the UE, to determine the anchor point such as UPF node for the UE. The solution enables mobility of a UE to an application instance which can service the UE in a more efficient manner i.e. by reduced latency of communication and capacity required to handle communication of the UE.

BRIEF DESCRIPTION OF THE DRAWINGS

Embodiments will now be described in more detail in relation to the enclosed drawings, in which:

FIG. 9 shows methods implemented in a communication system including a host computer, a base station and a user equipment in accordance with some embodiments;

FIG. 10 shows methods implemented in a communication system including a host computer, a base station and a user equipment in accordance with some embodiments;

DETAILED DESCRIPTION

Figure 1:
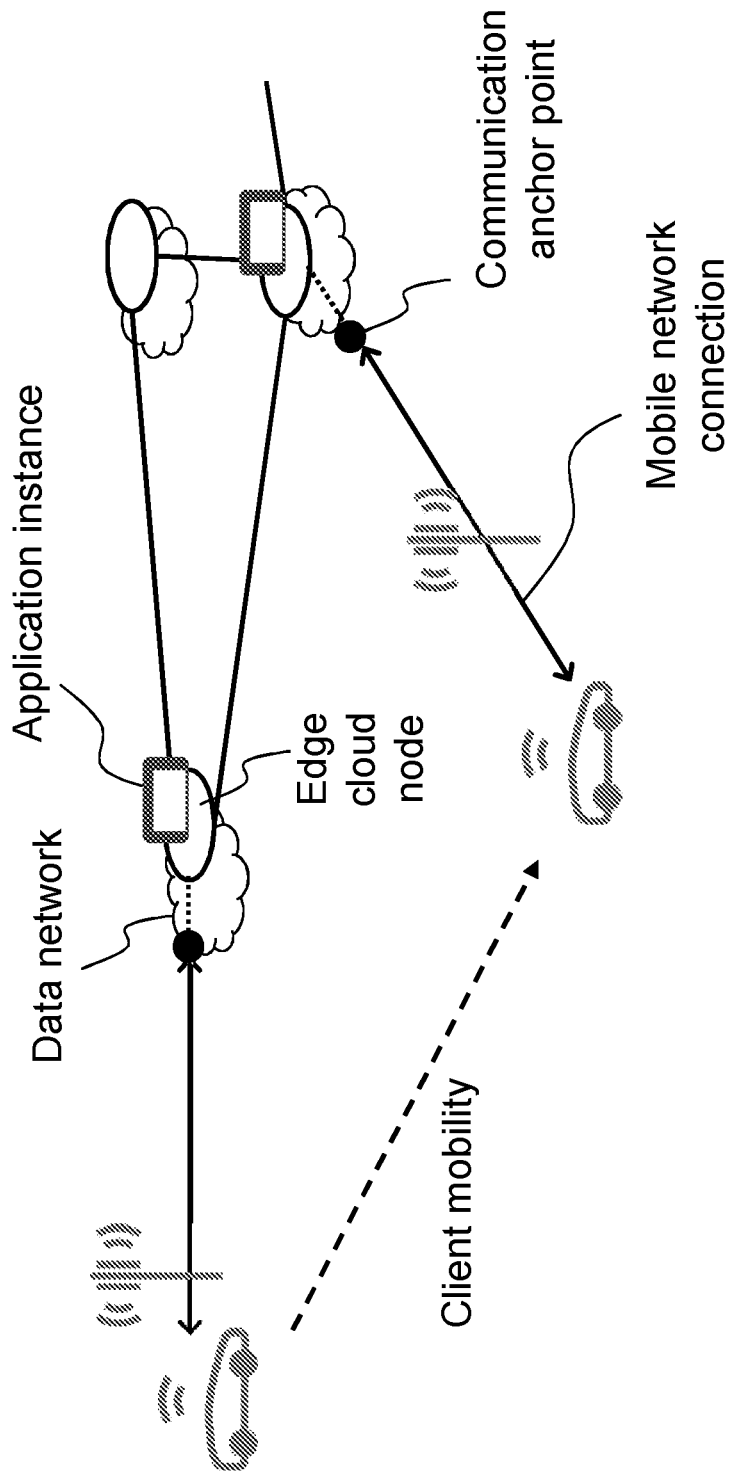
FIG. 1 is a schematic overview depicting a communication network using edge clouds.
Figure 2:
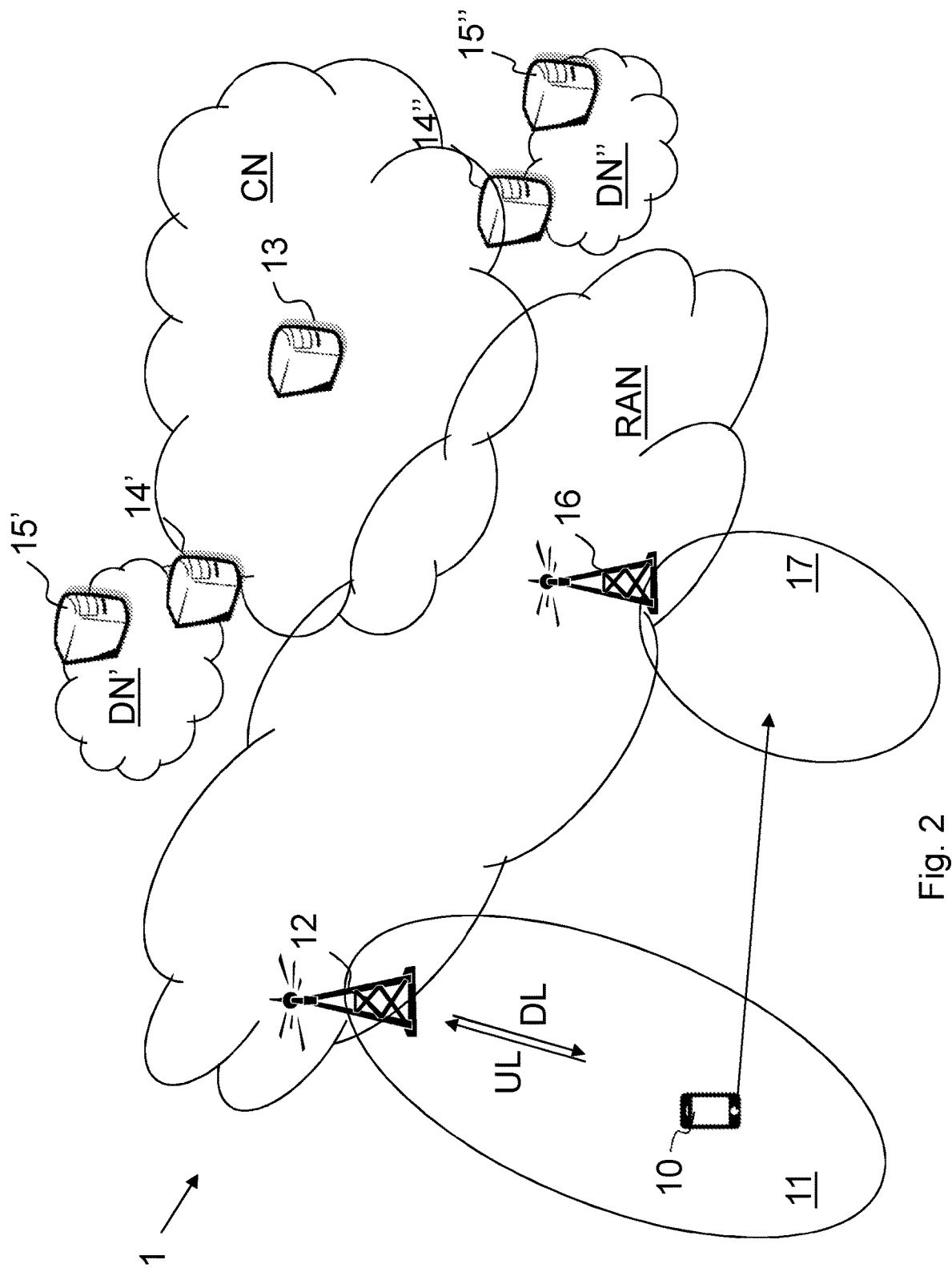
FIG. 2 is a schematic overview depicting a communication network according to embodiments herein.

Embodiments herein relate to communication networks in general. FIG. 2 is a schematic overview depicting a communication network 1. The communication network 1 comprises one or more RANs and one or more CNs. The communication network 1 may use one or a number of different technologies. Embodiments herein relate to recent technology trends that are of particular interest in a 5G context; however, embodiments are also applicable in further development of existing communication systems such as e.g. LTE and Wideband Code Division Multiple Access (WCDMA).

In the communication network 1, UEs are configured to communicate with one another e.g. a UE 10, such as a mobile station, a non-access point station (non-AP STA), a STA, a wireless device and/or a wireless terminal, may be configured for communication. It should be understood by the skilled in the art that "UE" is a non-limiting term which means any terminal, wireless communication terminal, user equipment, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a radio network node or a wireless device.

The communication network 1 comprises a radio network node 12, also referred to as a first radio network node, providing radio coverage over a geographical area, a service area 11, of a first radio access technology (RAT), such as NR or similar. The radio network node 12 may be a transmission and reception point such as an access node, an access controller, a base station, e.g. a radio base station such as a gNodeB (gNB), an evolved Node B (eNB, eNode B), a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node wherein the service area may be referred to as a serving cell, and the serving network node communicates with the UE 10 in form of DL transmissions to the wireless device 10 and UL transmissions from the wireless device 10. It should be noted that a service area may be denoted as cell, beam, beam group or similar to define an area of radio coverage. The radio network node 12 may beamform its transmissions towards one or more wireless devices such as the UE 10. Beamforming allows the signal to be stronger for an individual connection.

The communication network 1 further comprises a network node 13 referred to as control node or node with edge connectivity service which is a network node such as a server or a function collocated with another network node such as a mobility management entity (MME) or Access and Mobility Management function (AMF) node, or a stand-alone node. The network node 13 may thus be a network node comprising the edge connectivity service or may be any network node in the communication network. E.g. the communication network comprises a number of network node such as: AMF nodes that support termination of non-access stratum (NAS) signalling, NAS ciphering & integrity protection, registration management, connection management, mobility management, access authentication and authorization, security context management; one or more Session Management function (SMF) nodes which support: session management (session establishment, modification, release), UE IP address allocation & management, DHCP functions, termination of NAS signalling related to session management, DL data notification, traffic steering configuration for UPF for proper traffic routing; one or more User plane function (UPF) node which supports: packet routing & forwarding, packet inspection, quality of service (QoS) handling, acts as external protocol data unit (PDU) session point of interconnect to Data Network (DN), and is an anchor point for intra- & inter-RAT mobility. Other possible nodes or functions may be: Policy Control Function (PCF) node which supports: unified policy framework, providing policy rules to control plane (CP) functions, access subscription information for policy decisions in Unified Data Repository (UDR); an Authentication Server Function (AUSF) node which acts as an authentication server; a Unified Data Management (UDM) node which supports: generation of Authentication and Key Agreement (AKA) credentials, user identification handling, access authorization, subscription management; an Application Function (AF) node which supports: application influence on traffic routing, accessing NEF, interaction with policy framework for policy control; a Network Exposure function (NEF) node which supports: exposure of capabilities and events, secure provision of information from external application to 3GPP network, translation of internal/external information; and a Network function (NF) Repository function (NRF) node which supports: service discovery function, maintains NF profile and available NF instances.

The communication network 1 further comprises one or more data network nodes 14'-14", also referred to as an anchor point node such as a gateway nodes, UPF nodes or similar. The one or more data network nodes provides access to data network of the communication network from e.g. different operator networks or similar. The one or more data network nodes are identified by DNAIs.

The communication network 1 may further comprise one or more application nodes or application servers 15' and 15" also referred to as application server 15 comprising an application or a service using an edge connectivity service for connectivity to UEs that are accessing the end-user service provided by the application. The application server 15 may be referred to as cloud application node or similar and may comprise at least part of the application. The application, that provides the end-user service, may be a distributed application deployed across multiple locations, referred to as distributed networks (DN), DN' and DN". It may also be an application where individual application instances are deployed at multiple cloud locations. The method according to embodiments herein is performed by the network node 13. As an alternative, a Distributed Node and functionality, e.g. comprised in a cloud, may be used for performing or partly performing the method.

According to embodiments herein, based on location of the UE 10, the network node 13 determines an anchor point. Thus, the anchor point, that is the data network node 14'-14", may switch for the UE 10 providing connectivity to an application instance that is optimized in terms of e.g. latency, capacity, congestions, etc.

Figure 3:
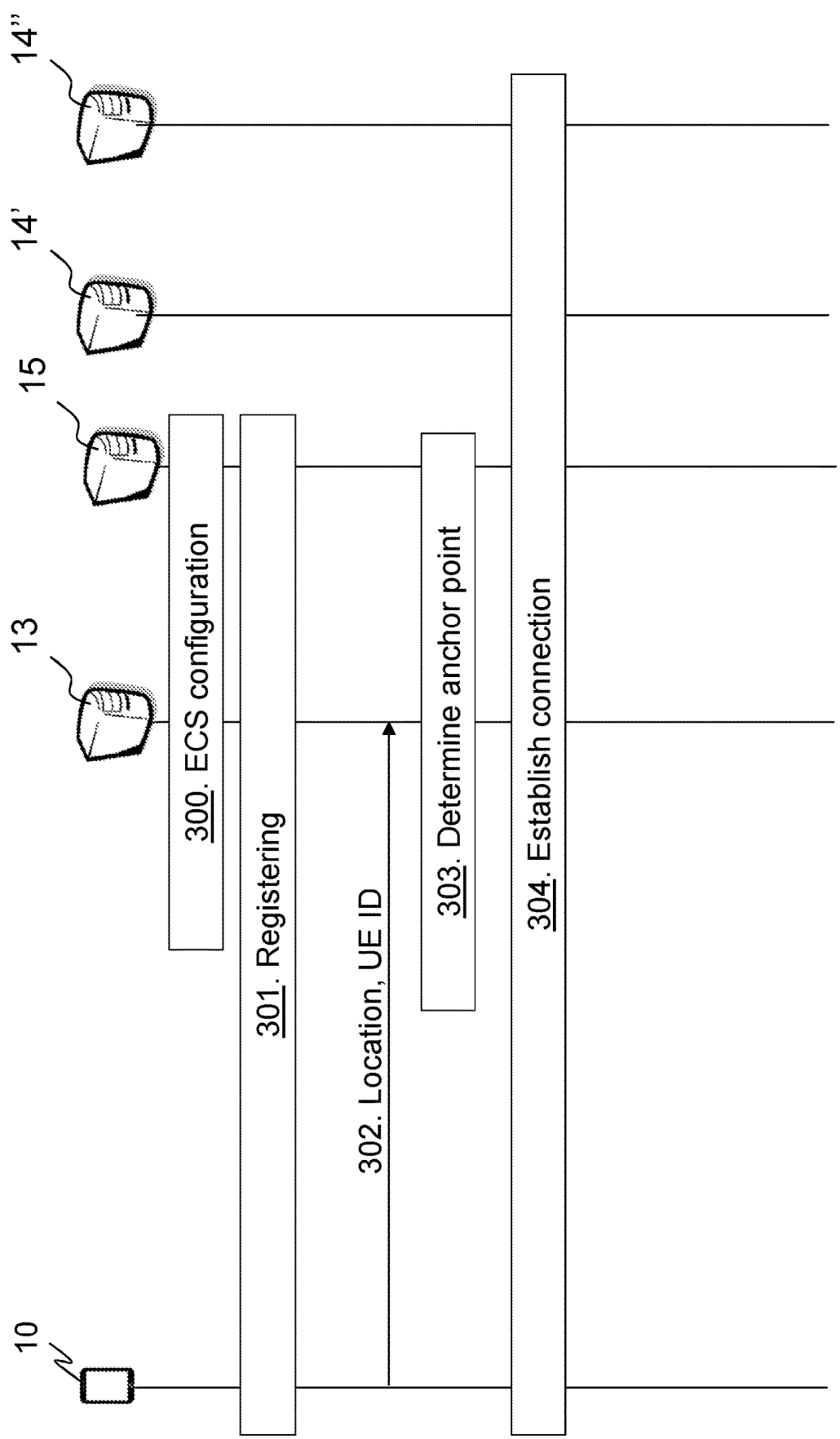
FIG. 3 shows a combined flowchart and signalling scheme according to embodiments herein.

FIG. 3 is a combined flowchart and signalling scheme according to embodiments herein. The actions do not have to be taken in the order stated below, but may be taken in any suitable order. Actions performed in some of the embodiments are marked as dashed boxes.

Action 300. The network node 13 may configure e.g. retrieve a policy concerning serving of anchor points based on the identity of the application, e.g. policy regarding mobility of UEs and switching of anchor points for providing the ECS for the application. This may be referred to as ECS configuration.

Action 301. The UE 10 is provisioned an end-user service provided by a cloud application either per request or based on other input. This triggers a registration of the UE to the application and to the ECS configured for the application i.e. the network node 13. The network node 13 may thus receive a registration message from an application server or the UE 10, wherein the registration message indicates identity of the application and identity of the UE 10, e.g. comprises an application ID and a UE ID. The network node 13 may thus collect UE ID and potentially application ID during the registration and the network node 13 may further store the policy for the identity of the UE 10 and the application. Hence, the ECS is firstly configured, wherein the ECS is associated with a policy for handover. Hence, the policy is retrieved or deduced during the ECS configuration see action 300. After and/or during the ECS configuration the ECS is associated with the cloud application (or multiple applications). After this is done the UE may register with the application and be provisioned a service according to ECS based on application requesting this connectivity service to the UE 10.

Action 302. The network node 13 may then continuously or periodically or upon certain events of the UE such as handover to another cell collect information such as location with e.g. UE ID. Hence, once the ECS is provisioned to the UE 10, the location of the UE 10 is continuously tracked in order to trigger changes in the mobile access network based on mobility between service areas of anchor points. Normally in 5GC, it would be the SMF node which manages the protocol data unit (PDU) sessions to the UEs based on predefined policies. Herein, the network node 13, also referred to as the edge service interface function (ESIF), is provided that offloads the SMF node from some of these tasks. Embodiments herein split responsibilities such that more static policies are defined in SMF node while policies that favorably could be customized dynamically on a per application basis is managed by the network node 13. The network node 13 may track UE location through e.g. 3GPP defined interfaces.

Action 303. The network node may then determine anchor point based on the location information retrieved about the UE 10.

Action 304. The network node 13 may e.g. determine to handover the UE to a different anchor point based on the location of the UE 10. The network node 13 may then trigger necessary PDU session changes associated with anchor point handover through 3GPP defined interfaces. Hence, providing an external entity for handling location aware routing allows more flexible implementation of policies not supported by the SMF node.

In particular, it allows for flexibility in implementing application influence on the location aware routing, not supported in the 3GPP framework. This includes application driven definitions of DNAI service areas and application involvement in DNAI handovers through handover approvals.

The network node 13 may thus:
continuously monitor TAs and DNAIs of clients associated with the ECS or alternatively subscribe to TA and DNAI update notifications via e.g. NEF;
compare the current UE TA with the current UE DNAI. If the current TA belongs to another DNAI service area (according to defined ECS policy in the network node 13), then the network node 13 may trigger inter-edge handover for the associated UE to the target DNAI;
before handover is done, the network node 13 may deliver value added services such as provide notifications to the application or ask the application for handover approval.

Upon handover the UE 10 may reestablish connection to the second data network node 14". The handover of the UE 10 to another anchor point such as another DNAI may be handled in different ways depending on deployment:
Dedicated PDU sessions for edge connectivity
The network node 13 may update UPF node selection policy used by SMF via 3GPP defined mechanism by adding a target DNAI as only allowed DNAI. The network node 13 may use AF requests (3GPP TS 23.501-5.6.7) related to policies for UPF node selection. The AF requests are sent either directly to the PCF node(s) via interface N5 or via NEF node (depending on operator configuration). The PCF node(s) transform(s) the AF requests into policies that apply to PDU Sessions and used by SMF node.

The AF request used by the network node 13 may include the following entries:
Potential locations of applications: target DNAI
Target UE Identifier(s): ClientID, e.g. Generic Public Subscription Identifier (GPSI), Subscription Permanent Identifier (SUFI), IP, medium access control or similar.
SMF node may trigger a session re-establishment based on the new policy via processes described in e.g. 3GPP TS 23.502-4.3.5.1-2. Alternatively, the network node 13 may orchestrate PDU session release and establishment, by utilizing options for network triggered PDU session release and establishment. The network node 13 may initiate a network triggered PDU Session Establishment procedure see e.g. 3GPP TS 23.502-4.3.2. The network node 13 does this by e.g. transmitting an application trigger to the UE 10 via NEF node see e.g. TS23.502-4.13.2.
Alternative deployments with IP version 6 (IPv6) multi-homing or UpLink Classifier (ULCL) based edge connectivity
In these cases the network node 13 may update anchor point selection policy by adding one or more DNAIs as allowed DNAIs. Due to higher complexity in session management, SMF node may trigger ULCL updates, adding anchor points and branching points. SMF node may then be configured to react to policy updates.

Figure 4A:
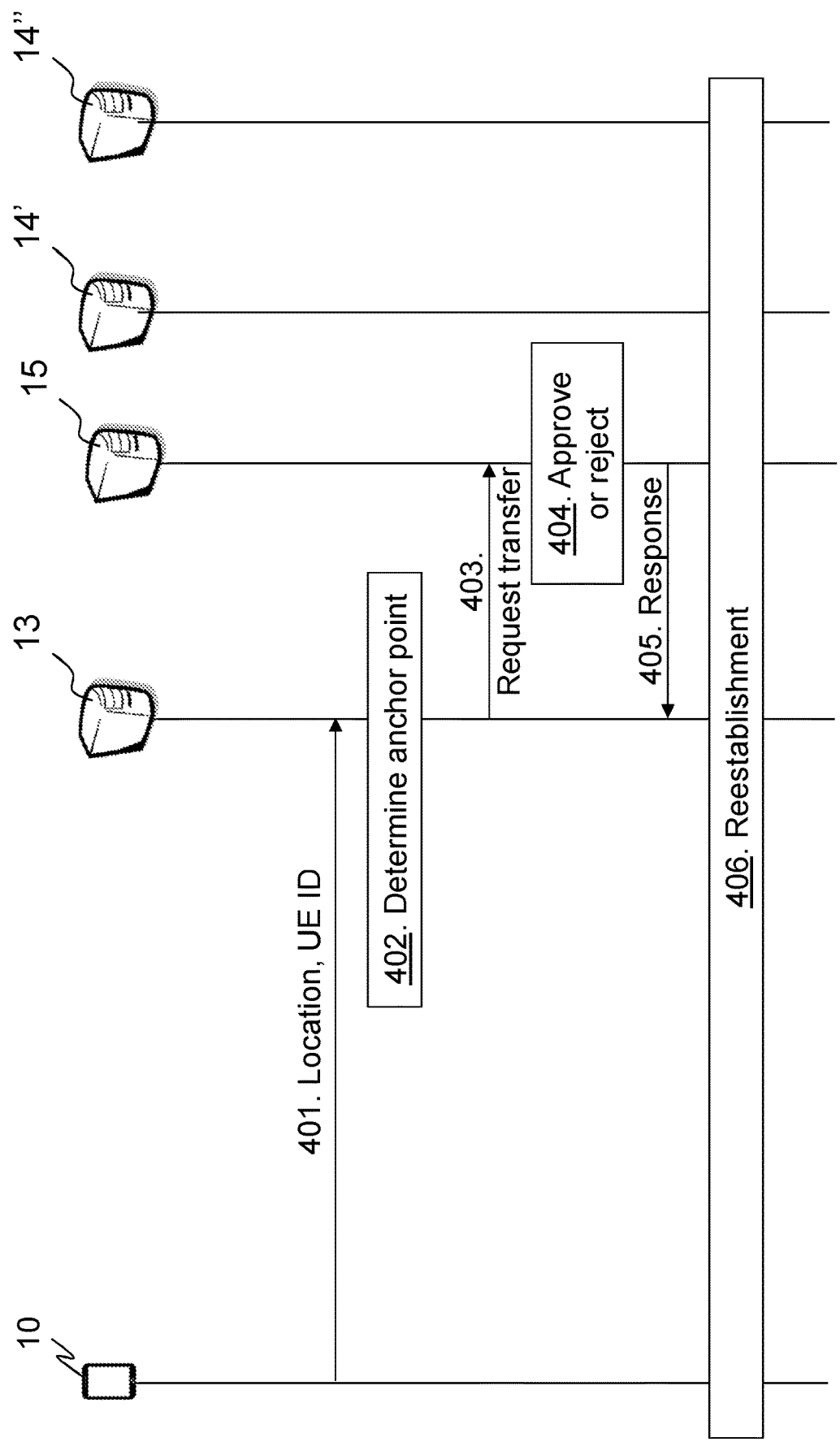
FIG. 4a shows a combined flowchart and signalling scheme according to embodiments herein.

FIG. 4*a* is a combined flowchart and signalling scheme according to some embodiments herein.

Action 401. The network node 13 may continuously collect or monitor location information for the UE 10, from the UE 10, another network node or from other location reports.

Action 402. The network node 13 determines anchor point to serve the UE based on the collected location information such as location of the UE 10.

Action 403. Upon determining a change of the anchor point, i.e. a transfer of anchor point, the network node 13 may send a request for transferring to the application server 15.

Action 404. The application server (AS) may then approve or reject the handover of UE 10 between anchor points. E.g. the application may not be ready to handle the UE from the target edge location (needs additional time). Or the application may not be able to handle the UE 10 from the target edge location because some functionality is missing at the target edge location. Or the application may prefer not to handle the UE 10 from the target edge location for load balancing reasons or resource availability. Thus, the AS may approve or reject based on load, resource capability or similar Action 405. The application server 15 may then transmit a response to the network node 13.

Action 406. The network node 13 may then initiate reestablishment of connection for the UE 10 for connecting via the second data network node 14".

Figure 4B:
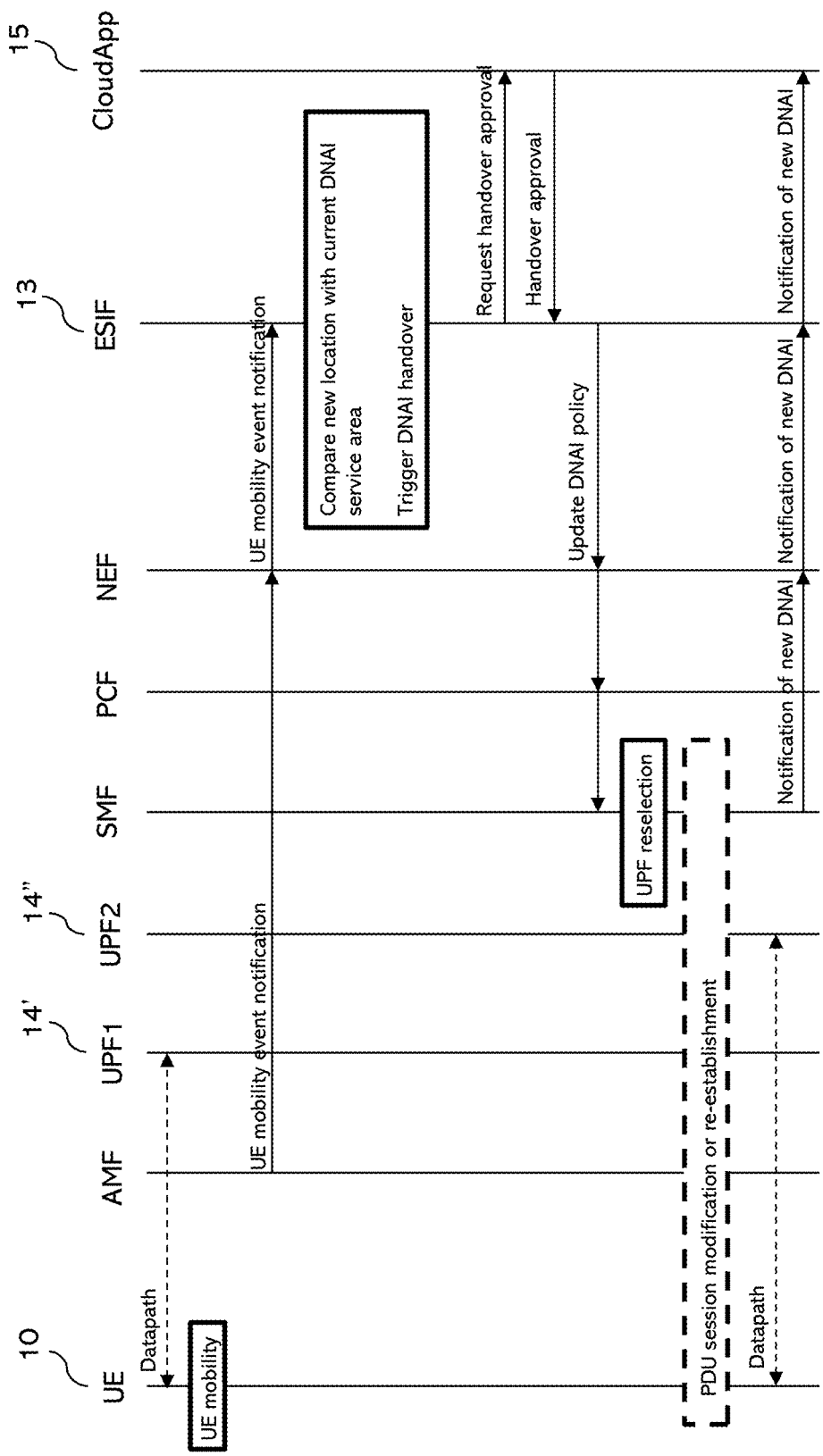
FIG. 4b shows a combined flowchart and signalling scheme according to embodiments herein.

FIG. 4*b* is a combined signalling scheme and flowchart according to some embodiments. The UE has a set up data path to the first anchor point e.g. UPF1.

The UE 10 moves within the communication network. Once the ECS is provisioned to one or more clients of respective UEs, the location of these clients must be continuously tracked in order to trigger changes in the mobile access network based on mobility between DNAI service areas i.e. areas served by anchor points. E.g. AMF node may transmit UE mobility event notifications to the ESIF via the NEF node.

The edge service interface function (ESIF) i.e. the network node 13 offloads the SMF node and responsibilities are split such that more static policies are defined in the SMF node while policies that are dynamically and on a per application basis is managed by the ESIF. The ESIF may track UE location through 3GPP defined interfaces. It may also trigger necessary PDU session changes associated with DNAI handover through 3GPP defined interfaces. Hence, providing an external entity, such as the network node 13, for handling location aware routing allows more flexible implementation of policies not supported by SMF node. The ESIF may compare new location of the UE 10 with current DNAI service area and if that differs the ESIF may trigger a DNAI handover. Embodiments herein allow for flexibility in implementing application (cloudApp) influence on the location aware routing, not supported in the 3GPP framework. This includes application driven definitions of DNAI service areas and application involvement in DNAI handovers through handover approvals.

The ESIF may continuously monitor TAs and DNAIs of clients associated with the ECS or alternatively subscribe to TA and DNAI update notifications via e.g. NEF. The ESIF may compare the current UE TA with the current UE DNAI. If the current TA belongs to another DNAI service area (according to defined ECS policy in ESIF), then ESIF may trigger inter-edge handover for the associated client to the target DNAI. Before handover is done, ESIF may deliver value added services such as provide notifications to the application or ask the cloud application for handover approval as shown.

The ESIF may inform nodes about updated DNAI policy and the SMF node may perform a UPF node reselection. Client handover to a new DNAI may be handled in different ways depending on deployment Dedicated PDU sessions for edge connectivity
        ESIF may update UPF selection policy via 3GPP defined mechanism by adding target DNAI as only allowed DNAI. ESIF uses AF requests (3GPP TS 23.501-5.6.7) related to policies for UPF selection. The AF requests are sent either directly to the PCF(s) via N5 or via NEF (depending on operator configuration). The PCF(s) transform(s) the AF requests into policies that apply to PDU Sessions and used by SMF. The AF request used by ESIF includes the following entries:
        Potential Locations of Applications: target DNAI
        Target UE Identifier(s): ClientID, i.e. GPSI/SUPI/IP/MAC
    SMF should trigger a session re-establishment based on the new policy via processes described in (3GPP TS 23.502-4.3.5.1-2). Alternatively, ESIF may orchestrate PDU session release and establishment, by utilizing options for network triggered PDU session release and establishment. ESIF initiates a network triggered PDU Session Establishment procedure (3GPP TS 23.502-4.3.2). ESIF does this by invoking an application trigger to the UE via NEF. (TS23.502-4.13.2).
    Alternative deployments with IPv6 multi-homing or ULCL based edge connectivity
        In these cases ESIF updates UPF selection policy by adding DNAI as allowed DNAI.
        Due to higher complexity in session management, SMF should trigger ULCL updates, adding anchor points and branching points. SMF must then be configured to react to policy updates.

Figure 5:
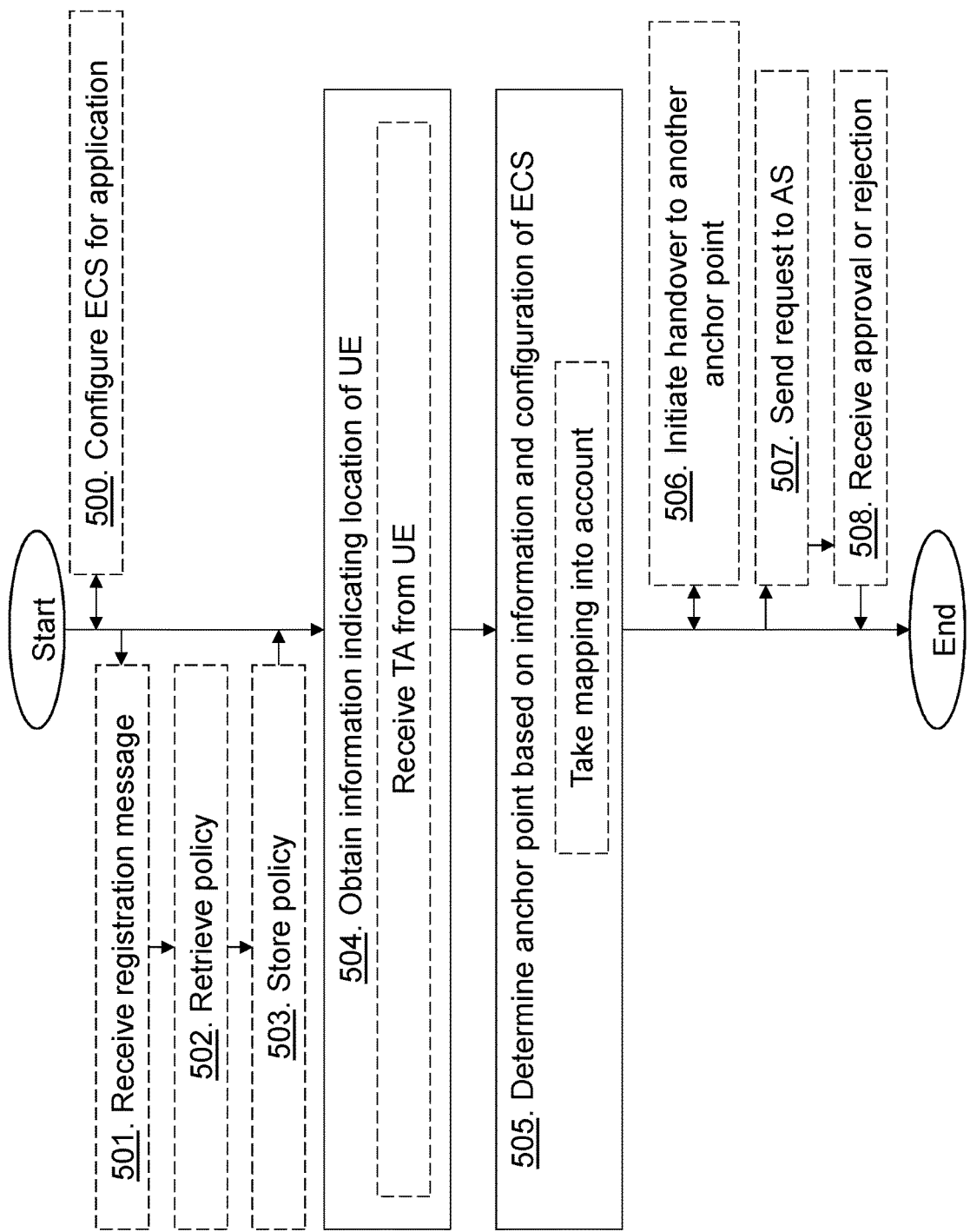
FIG. 5 shows a schematic flowchart depicting a method performed by a network node according to embodiments herein.

The method actions performed by the network node 13 for handling communication in the communication network according to embodiments will now be described with reference to a flowchart depicted in FIG. 5. The actions do not have to be taken in the order stated below, but may be taken in any suitable order. Actions performed in some of the embodiments are marked as dashed boxes.

Action 500. The network node 13 may configure ECS for an application providing a location aware edge connectivity service (ECS). The edge connectivity service may define a list of locations mapped to a respective identity of the data network node e.g. DNAI. Each DNAI represents a connectivity anchor point i.e. a data network node 14'-14" for an edge cloud location. The set of DNAIs belonging to the ECS depend on the application. For each DNAI there is a corresponding service area defined e.g. a geographical area served by an edge location. The service area may be defined as a set of tracking areas (TA) which in turn are inherently defined by the mobile access network. The mapping of TAs to DNAI may be performed by the network node 13 and may be performed in multiple ways. The mapping also depends on the set of DNAIs that are part of the service, as a smaller set of DNAIs require larger service areas per DNAI. Embodiments herein enable a flexible mapping of TAs to DNAIs.

One way of mapping TAs to DNAI is according to network topology. For the case of a tree like structure of the access network, TAs corresponding to base stations below the DNAI in the access topology can be mapped to the DNAI. Such mapping may require knowledge of the network topology. Another way of mapping TAs to DNAIs is based on measurements of metrics (e.g. average latency between clients belonging to a TA and DNAI). In this case mapping of TAs may be performed by minimizing/maximizing such a performance metric. It may also consider other metrics such as even distribution of TAs in DNAIs. It may also consider measured traffic load per TA.

Action 501. The network node 13 may receive a registration message from an application server or the UE, wherein the registration message indicates identity of the application and identity of the UE 10.

Action 502. The network node 13 may further retrieve a policy concerning serving of anchor points based on the identity of the application e.g. as configured. This may be performed before or during the registration of the UE.

Action 503. The network node 13 may further store the retrieved policy for the identity of the UE 10 (or policy mapped to the UE ID).

Action 504. The network node 13 obtains location information indicating the location of the UE 10. The location information may further comprise indication of identity of the UE and/or indication of identity of the application. The location information may be indicating the location of the UE by a tracking area (TA) of the UE 10.

Action 505. The network node 13 determines anchor point, e.g. data network node, for the UE 10 based on the obtained location information and the configuration of the ECS associated with the application. The network node 13 may determine the anchor point by taking the mapping into account, see action 500. The mapping maps tracking areas indicating locations to data network access identifiers corresponding to anchor points. The network node 13 may take load (edge node load) and/or other performance metric, such as throughput, transfer rate, latency, of the location of the UE (UE location) into account when determining the anchor point.

Action 506. The network node 13 may when the determined anchor point is a second anchor point initiate a handover to the second anchor point from a first anchor point based on the location of the UE 10. E.g. handover the UE 10 from the first data network node 14' to the second data network node 14".

Action 507. The network node 13 may upon determining a change of anchor point, send a request to an application server 15, i.e. a node with application providing ECS, providing at least part of the application for handover approval.

Action 508. The network node 13 may receive an approval or a rejection from the application server 15.

Embodiments herein provide a location aware edge connectivity service to a client which may involve:
- 3GPP external handling (in the network node 13) of certain policies (edge service areas and application influence) and connectivity management related to edge connectivity services;
- For each ECS, associating each involved edge site with a service area corresponding to a geographical region based on tracking areas (TAs) defined by the mobile access network;
- the network node 13 may monitor current TAs and current edge site affiliation of clients associated with the application and triggering application influence and edge handover according to policies defined in the network node 13;
- the network node configuration of inter-edge handover by interacting with the mobile packet core through the 3GPP defined framework.

Figure 6:
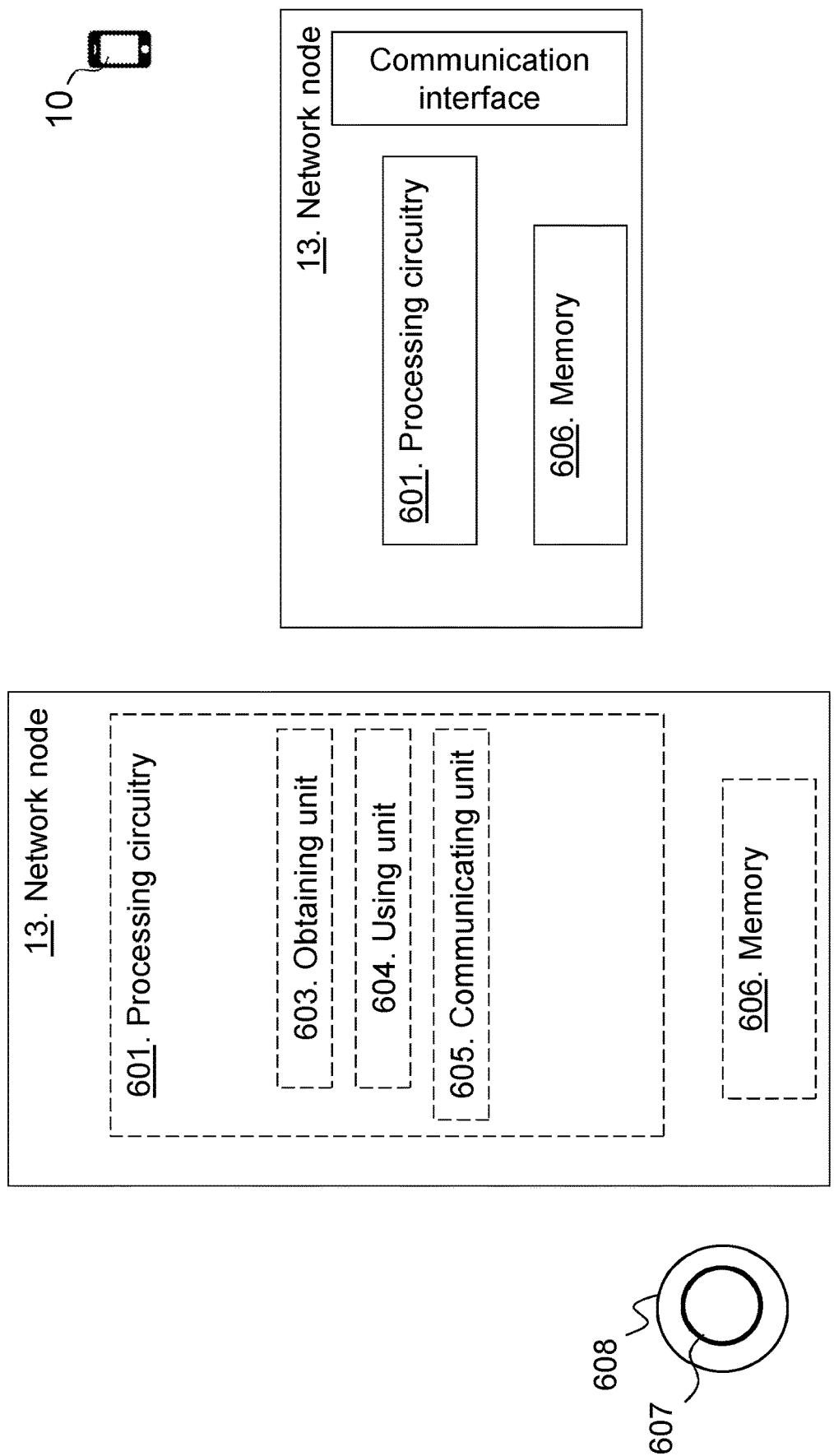
FIG. 6 is a block diagram depicting a network node according to embodiments herein.

FIG. 6 is a block diagram depicting the network node 13, in two embodiments, for providing the application to service the UE 10 in the communication network according to embodiments herein.

The network node 13 may comprise processing circuitry 701, e.g. one or more processors, configured to perform the methods herein.

The network node 13 may comprise an obtaining unit 702, e.g. a receiver module or a transceiver module. The network node 13, the processing circuitry 701, and/or the obtaining unit 702 is configured to obtain location information indicating a location of the UE 10. The location information may further comprise indication of identity of the UE. The location information may be indicating the location of the UE by the tracking area of the UE.

The network node 13 may comprise a determining unit 703, e.g. a processor module. The network node 13, the processing circuitry 701, and/or the determining unit 703 is configured to determine the anchor point for the UE 10 based on the obtained location information and the configuration of the edge connectivity service associated with the application. The network node 13, the processing circuitry 701, and/or the determining unit 703 may be configured to determine the anchor point by taking a mapping into account, wherein the mapping maps tracking areas indicating locations to data network access identifiers corresponding to anchor points. The network node 13, the processing circuitry 701, and/or the determining unit 703 may be configured to determine the anchor point by further taking load and/or other performance metric of the location of the UE into account.

The network node 13 may comprise a handover unit 704. The network node 13, the processing circuitry 701, and/or the handover unit 704 may be configured to, wherein the determined anchor point is a second anchor point. initiate a handover to the second anchor point from a first anchor point based on the location of the UE 10.

The network node 13 may comprise a sending unit 704, such as a transmitter or transceiver. The network node 13, the processing circuitry 701, and/or the sending unit 704 may be configured to, upon determining a change of anchor point, send a request to an application server providing at least part of the application for handover approval; and receive an approval or a rejection from the application server.

The network node 13, the processing circuitry 701, and/or the obtaining unit 702 may be configured to receive a registration message from an application server or the UE, wherein the registration message indicates identity of the application and identity of the UE. The network node 13, the processing circuitry 701, and/or the obtaining unit 702 may further be configured to retrieve a policy concerning serving of anchor points based on the identity of the application; and to store the policy for the identity of the UE.

The network node 13 may comprise a configuring unit 705, e.g. a processor module. The network node 13, the processing circuitry 701, and/or the configuring unit 705 may be configured to configure the edge connectivity service for the communication network.

The network node 13 further comprises a memory 706. The memory comprises one or more units to be used to store data on, such as signal strengths or qualities, mappings of TA to anchor points, service IDs, UE IDs of subscribing UEs, applications to perform the methods disclosed herein when being executed, and similar. The network node 13 may further comprise a communication interface comprising e.g. one or more antenna or antenna elements.

The methods according to the embodiments described herein for the network node 13 are respectively implemented by means of e.g. a computer program product 707 or a computer program, comprising instructions, i.e., software code portions, which, when executed on at least one processor, cause the at least one processor to carry out the actions described herein, as performed by the network node 13. The computer program product 707 may be stored on a computer-readable storage medium 708, e.g. a disc, a universal serial bus (USB) stick or similar. The computer-readable storage medium 708, having stored thereon the computer program product, may comprise the instructions which, when executed on at least one processor, cause the at least one processor to carry out the actions described herein, as performed by the network node 13. In some embodiments, the computer-readable storage medium may be a transitory or a non-transitory computer-readable storage medium.

In some embodiments a more general term "network node" is used and it can correspond to any type of radio-network node or any network node, which communicates with a wireless device and/or with another network node. Examples of network nodes are NodeB, gNodeB, eNodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 7:
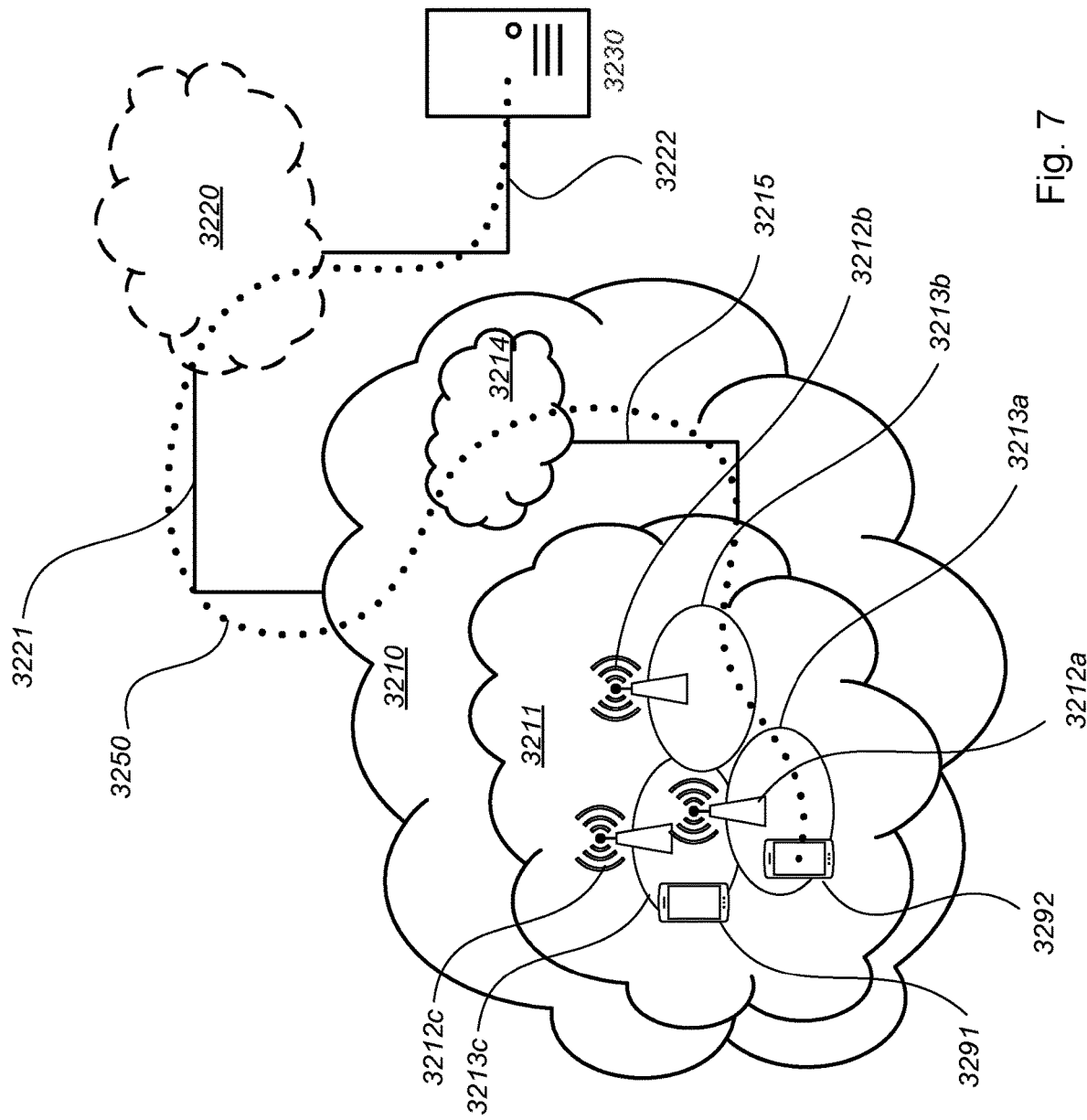
FIG. 7 shows a telecommunication network connected via an intermediate network to a host computer in accordance with some embodiments.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
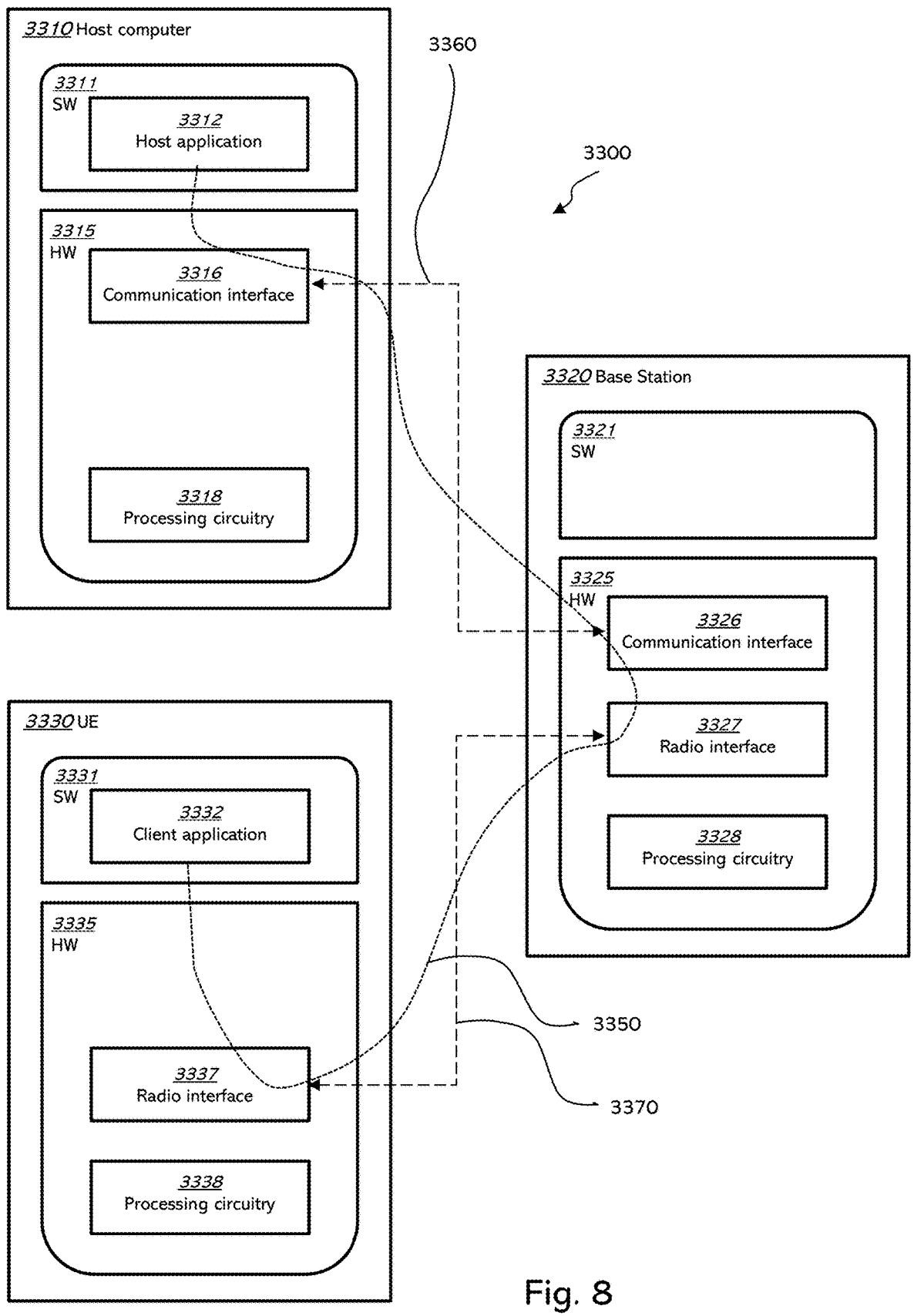
FIG. 8 shows a host computer communicating via a base station with a user equipment over a partially wireless connection in accordance with some embodiments.

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve edge connectivity service resulting in an efficient use of resource with improved performance and that may affect the latency and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 11:
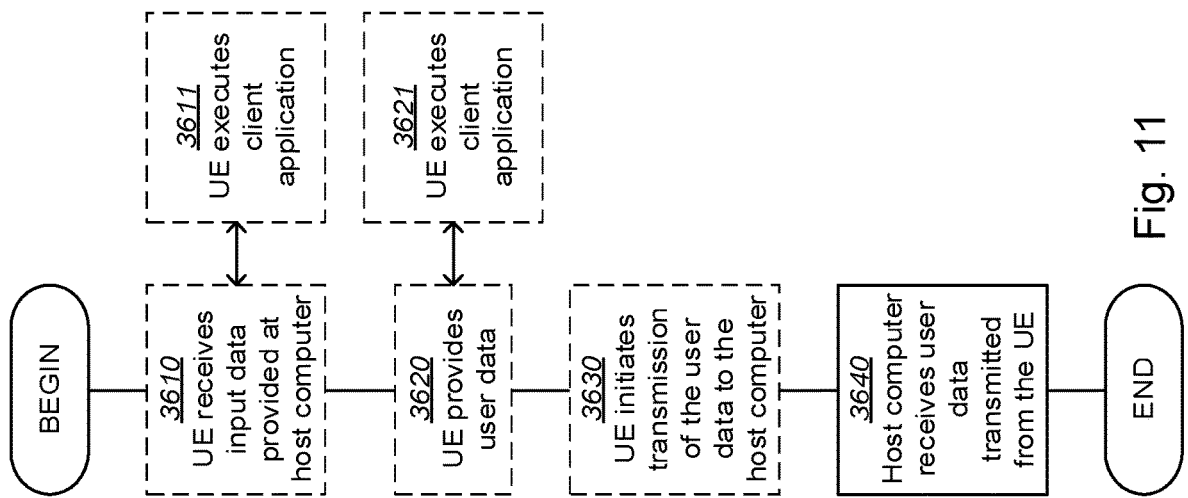
FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 12:
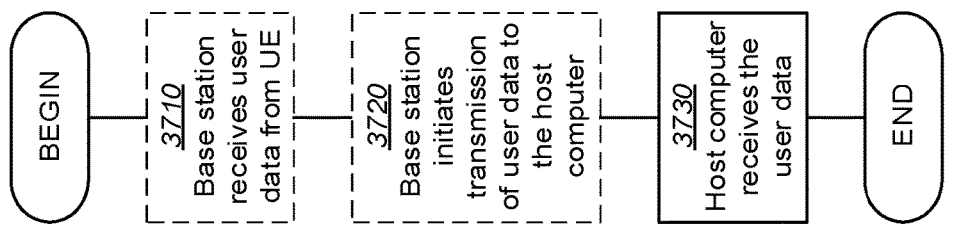
FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for providing an application to service a user equipment, UE, in a communication network, wherein the network node corresponds to an edge service interface function (ESIF) other than a session management function (SMF) node, the method comprising obtaining, by the ESIF, information indicating a location of the UE;

determining, by the ESIF, a second anchor point for the UE based on the obtained information and a configuration of an edge connectivity service associated with the application, wherein the edge connectivity service defines a connectivity service provided for the application to service the UE, wherein determining the second anchor point is taking a mapping into account, wherein the mapping maps tracking areas indicating locations to data network access identifiers (DNAIs) corresponding to anchor points according to measurements of metrics, the measurements of metrics comprising an average latency between clients belonging to at least one of the tracking areas and at least one of the DNAIs;

determining, by the ESIF, a change of an anchor point from a first anchor point to the second anchor point, wherein determining the change of the anchor point from the first anchor point to the second anchor point is in response to:

comparing a current tracking area of the UE with a current DNAI of the UE;

determining, based at least on comparing the current tracking area of the UE with the current DNAI of the UE, that the current tracking area of the UE belongs to another DNAI service area according to a defined edge connectivity service policy; and in response to determining that the current tracking area of the UE belongs to another DNAI service area according to the defined edge connectivity service policy, triggering an inter-edge handover for the UE to a target DNAI;

upon determining, by the ESIF, the change of an anchor point from a first anchor point to the second anchor point:

updating, by the ESIF, an edge connectivity selection policy for at least one alternative deployment, wherein updating the edge connectivity selection policy comprises adding the determined second anchor point corresponding to a data network node as an allowed DNAI for the edge connectivity service for the application;

sending, by the ESIF, a request to an application server providing at least part of the application, for approval of a handover of the UE from the first anchor point to the second anchor point; and receiving, by the ESIF, an approval or a rejection of the request, from the application server.

2. The method according to claim 1, wherein the location information further comprises indication of identity of the UE.

3. The method according to claim 1, wherein the location information is indicating the location of the UE by a tracking area of the UE.

4. The method according claim 1, further comprises:
initiating the handover to the second anchor point from the first anchor point based on the location of the UE.

5. The method according to claim 1, wherein determining the second anchor point is further taking an edge node load and/or other network performance metric at the location of the UE into account.

6. The method according to claim 1, further comprising
receiving a registration message from the application server or the UE, wherein the registration message indicates identity of the application and identity of the UE;
retrieving a policy concerning serving of anchor points based on the identity of the application; and
storing the policy for the identity of the UE.

7. The method according to claim 1, further comprising configuring the edge connectivity service for the communication network.

8. A non-transitory computer-readable medium comprising instructions, which, when executed on at least one processor, cause the at least one processor to carry out the method according to claim 1, as performed by the network node.

9. A network node for providing an application to service a user equipment, UE, in a communication network, wherein the network node corresponds to an edge service interface function (ESIF) other than a session management function (SMF) node, wherein the network node is configured to
obtain, by the ESIF, location information indicating a location of the UE;
determine, by the ESIF, a second anchor point for the UE based on the obtained location information and a configuration of an edge connectivity service associated with the application, wherein the edge connectivity service defines a connectivity service provided for the application to service the UE, wherein the network node is configured to determine the second anchor point by taking a mapping into account, wherein the mapping maps tracking areas indicating locations to data network access identifiers (DNAIs) corresponding to anchor points according to measurements of metrics, the measurements of metrics comprising an average latency between clients belonging to at least one of the tracking areas and at least one of the data network access identifiers, DNAIs;
determine, by the ESIF, a change of an anchor point from a first anchor point to the second anchor point, wherein the network node configured to determine the change of the anchor point from the first anchor point to the second anchor point is further configured to:
compare a current tracking area of the UE with a current DNAI of the UE;
determine, based at least on a comparison between the current tracking area of the UE and the current DNAI of the UE, that the current tracking area of the UE belongs to another DNAI service area according to a defined edge connectivity service policy; and
in response to a determination that the current tracking area of the UE belongs to another DNAI service area according to the defined edge connectivity service policy, trigger an inter-edge handover for the UE to a target DNAI;
upon determining, by the ESIF, the change of an anchor point from a first anchor point to the second anchor point:
update, by the ESIF, an edge connectivity selection policy for at least one alternative deployment, wherein the network node configured to update the edge connectivity selection policy for at least one alternative deployment comprises a network node configured to add the determined second anchor point corresponding to a data network node as an allowed DNAI for the edge connectivity service for the application; and
send, by the ESIF, a request to an application server providing at least part of the application for approval of a handover of the UE from the first anchor point to the second anchor point; and
receive, by the ESIF, an approval or a rejection of the request, from the application server.

10. The network node according to claim 9, wherein the location information further comprises indication of identity of the UE.

11. The network node according to claim 9, wherein the location information is indicating the location of the UE by a tracking area of the UE.

12. The network node according to claim 9, wherein the network node is further configured to initiate the handover to the second anchor point from the first anchor point based on the location of the UE.

13. The network node according to claim 9, wherein the network node is configured to determine the second anchor point by further taking an edge node load and/or other network performance metric of the location at the UE into account.

14. The network node according to claim 9, wherein the network node is further configured to:
receive a registration message from the application server or the UE, wherein the registration message indicates identity of the application and identity of the UE;
retrieve a policy concerning serving of anchor points based on the identity of the application; and
store the policy for the identity of the UE.

15. The network node according to claim 9 wherein the network node is further configured to configure the edge connectivity service for the communication network.

* * * * *